United States Patent [19]

Soby

[11] 4,016,803
[45] Apr. 12, 1977

[54] SERVO DEVICE

[75] Inventor: Svend Ove Soby, Sonderborg, Denmark

[73] Assignee: Danfoss A/S, Nordborg, Denmark

[22] Filed: Nov. 10, 1975

[21] Appl. No.: 630,293

[30] Foreign Application Priority Data

Nov. 12, 1974  Germany .................... 2453561

[52] U.S. Cl. ........................ 91/43; 91/35; 91/44; 91/45; 91/361; 91/410
[51] Int. Cl.² ........................ F15B 15/26
[58] Field of Search .......... 91/35, 361, 363 R, 405, 91/410, 43, 44, 45

[56] References Cited

UNITED STATES PATENTS

| | | | |
|---|---|---|---|
| 2,613,703 | 10/1952 | Calvert | 91/35 |
| 3,263,572 | 8/1966 | Sunderland | 91/361 |
| 3,732,027 | 5/1973 | Lupke | 91/410 |
| 3,802,318 | 4/1974 | Sibbald | 91/363 R |
| 3,896,914 | 7/1975 | Konsbruck | 91/361 |

*Primary Examiner*—Martin P. Schwadron
*Assistant Examiner*—Abraham Hershkovitz

[57] ABSTRACT

The invention relates to a servo assembly having a stationary part including a housing, a movable member and a servo motor. Of primary interest is the stopping mechanism which includes a stop unit on the movable member and two pressure operated, vertically reciprocal stop members mounted in the housing. Two hydraulic circuits are provided with a first circuit for the two stop members and the second circuit for the servo motor. Throttle valving for the first circuit is provided between the two stop members and the housing. Prior to reaching a stopping position the stop unit on the movable member actuates a switch which relieves the pressure in the first circuit and causes one of the stop members to descend to an intermediate position where throttling occurs and the other stop member to descend to a final position where throttling may or may not occur. The throttling causes substantial braking of the movable member during a short distance of travel just prior to the stopping position being reached. A rib on the stop unit of the movable member is arranged to control the intermediate and final positions of the two vertically movable stop members.

7 Claims, 8 Drawing Figures

SERVO DEVICE

The invention relates to a servo device comprising a stationary member and a member which is movable by a servo motor and the holding position of which can be determined by at least one mechanical stop on the one member and a counterstop on the other member, particularly for industrial robots.

In servo devices of this kind, it is endeavoured that the movable member repeatedly travels an accurately predetermined but adjustable path. In an industrial robot one can in this way control gripping elements in order to handle workpieces automatically.

A known servo device has a pneumatic servo motor which permits the movable member to travel against an adjustable stop, the impact occurring on abutment being taken up by a shock absorber. This results in considerable wear, difficulties in the accurate control and relatively high operating costs.

The invention is based on the object of providing a servo device of the aforementioned kind which can be accurately controlled with less wear and lower operating costs.

This object is achieved in accordance with the invention in that a hydraulic servo motor is in series with an on-off switching valve and at least one switching throttle, that the stop is formed by a rib of substantially rectangular cross-section transverse to the direction of advance, that two slides disposed in a housing behind one another in the direction of advance are displaceable by a force on actuation of an actuating apparatus from a first position lying beyond the projection of the ribs to a second position within the projection of the ribs and are spaced apart at their end no more than slightly in excess of the rib width so that the one slide is held by the rib in a third intermediate position until reaching the holding position, and that the switching throttle throttles when the one slide is in the second position and the other slide in the third position and that the switching valve switches off when both slides are in the second position.

By using a hydraulic servo motor, the operating costs can be reduced because for a given operation it is cheaper to pump a corresponding amount of oil than to compress a corresponding amount of air. Since throttling takes place before reaching the holding position, the movable member is braked so that it comes to rest solely by switching off the switching valve but at least only very small inertia forces occur when the counterstop formed by a slide strikes the stop formed by the rib. No shock absorber is therefore required. Vibrations do not occur; wear is minimal. Another result is that a very accurate holding position is obtained, for example with a tolerance of ±1/100 mm. A new holding position can be set merely by displacing the rib or the pair of slides on the associated member of the servo device.

Preferably, the rib and slide are symmetrically formed with respect to a plane transverse to the direction of advance. The arrangement can therefore be used in both directions of movement so that, for example, an intermediate hold is possible in both directions of movement.

Further, a switching throttle may be provided in both connecting conduits of the servo motor and each slide may form the part of a switching throttle. In this way it is ensured that, irrespective of which slide is located in the third intermediate position by reason of the direction of movement of the servo motor, like conditions obtain in the connecting conduits of the servo motor so that the braking step is the same regardless of the direction of movement.

In particular, the slide can have a hole which connects two housing holes and in the second position releases a smaller cross-section than in the first position. The slide going into the second position then undertakes the throttling, although the slide located in the third intermediate position may also participate in the throttle effect.

In addition, an adjusting member partially filling the cross-section may be insertable in the hole of the slide. This permits the throttle effect and thus the braking effect to be set accurately.

It is of particular advantage if the switching valve is electromagnetically actuatable and if the slides actuate associated switching contacts. As soon as the slide in the holding position is pressed from the third intermediate position to the second position, there will be actuation of the switching contacts which switch off the switching valve.

In a preferred embodiment, each slide is biassed towards the rib by a spring and for biassing in the opposite direction possesses a pressure surface provided in a pressure chamber which is selectively connectible to a hydraulic pressure source or to an exhaust by means of an actuating valve which is actuatable by the actuating apparatus. As long as the pressure chamber is connected to the source of pressure medium, the slide is located in the first position and, as soon as it is connected to the exhaust, it moves to the second position if it is not held by the rib in the third intermediate position.

It is particularly favourable if the actuating apparatus comprises an actuating switch which is actuatable by a step in front of the rib when the other slide is already over the rib. This actuating switch can, for example, be in series with a programme switch which selects the stop to be effective. The actuating switch ensures in a simple manner that actuation occurs at the correct instant of time.

For example, it is ensured that the rib is seated on a block of which the edge forms the step, that at least two switch tappets are juxtaposed in the slide housing, that throughgoing grooves are provided in the top surface of the block for the tappets that are not to be actuated, and that at least two blocks with different groove arrangements are provided. In this way a particular stop is characterised by the switch tappet that is actuated. If this is selected for the next actuation, actuation takes place.

It is of particular advantage if the hydraulic servo motor is a rotary piston motor with rotary and revolving rotor, of which the rotary motion directly drives the movable member, e.g. through a coupling or a rack drive. Such rotary piston motors have the advantage that, without any gear reduction, they have a very low output speed but possess a very high torque. The low speed permits the direct drive. The high torque is reduced to an unobjectionable value by the throttling operation shortly before reaching the holding position.

The invention will now be described in more detail with reference to an example illustrated in the drawing. In the drawing:

FIG. 7 is an end elevation of the slide housing.

Figure 1:
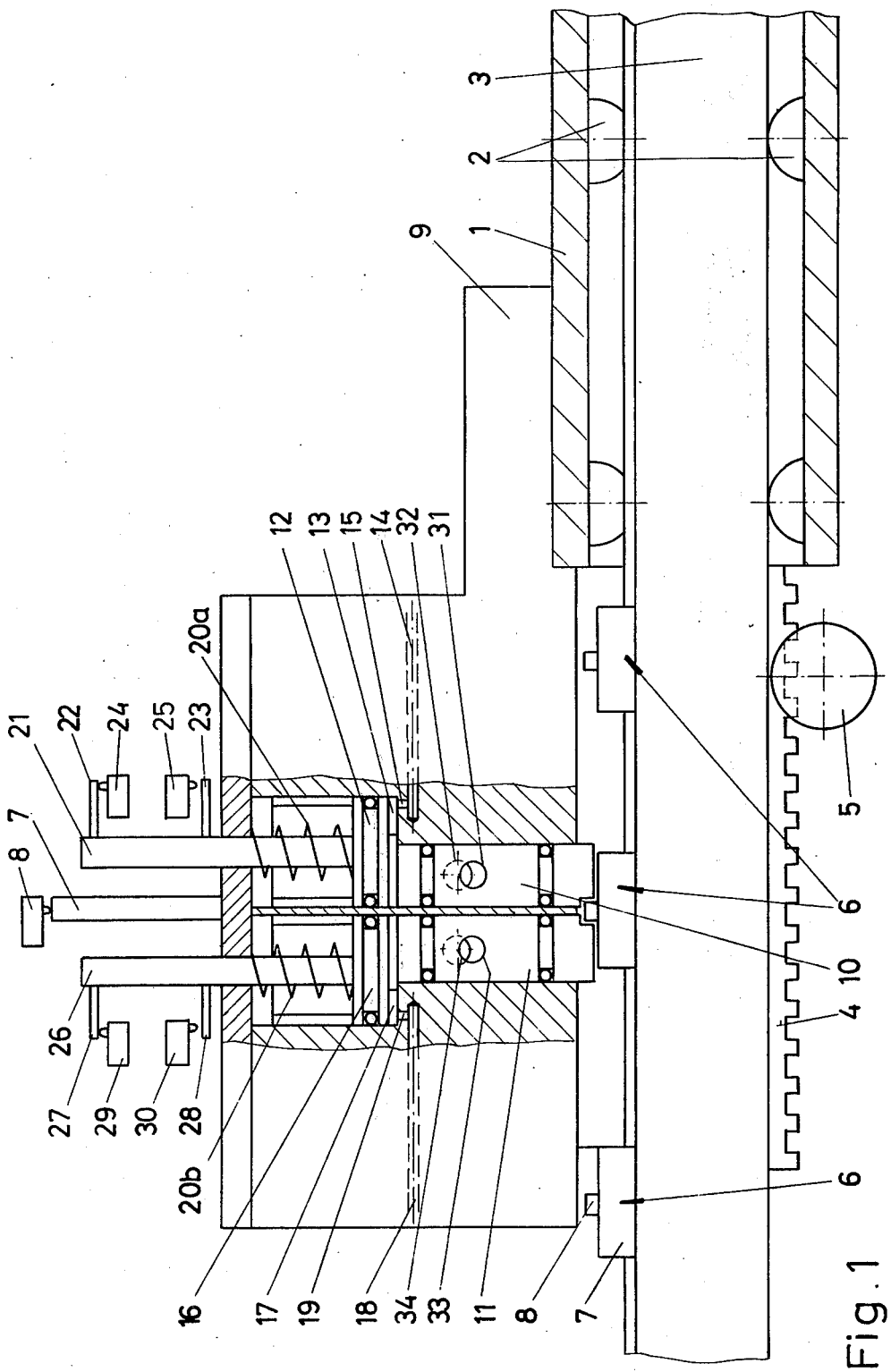
FIG. 1 is a part-sectional side elevation of a servo device with several stops.

In a stationary member 1, a movable member 3 is displaceable on rollers 2. The movable member carries a rack 4 which is connected directly to the rotating and revolving rotor by the output shaft of a hydraulic rotary piston motor, the output shaft participating in the rotary movement of the rotor. Further, adjustably mounted on the movable member 3 there are several stop units 6, each consisting of a block 7 and a rib 8 that is transverse to the direction of advance.

Mounted on the stationary member 1 there is a housing 9 in which two slides 10 and 11 are movably mounted transversely to the direction of advance. The slide 10 comprises a piston 12 which bounds a pressure chamber 13 which can be supplied with pressure fluid through a conduit 14 and a hole 15. Similarly, the slide 11 has a piston 16 which bounds a pressure chamber 17 which can be supplied with pressure fluid through a conduit 18 and a hole 19. Whereas the slides 10, 11 can be pushed upwardly, each is associated with a spring 20a, 20b which bias it in the opposite direction. The sealing rings accommodated in grooves of the slides and the pistons are merely indicated.

Figure 4:
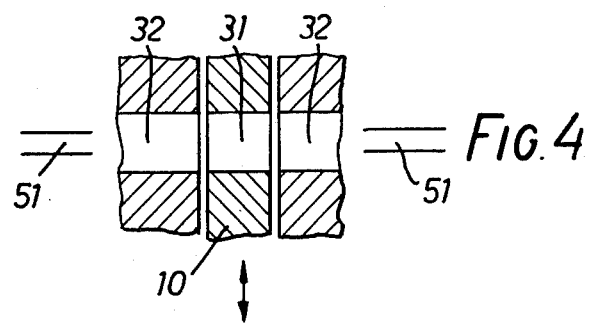
FIG. 4 is a partial cross-section through the switching throttle.
Figure 5:
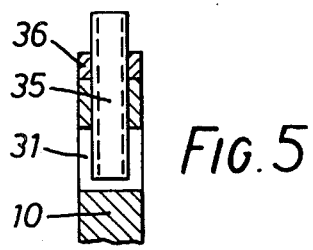
FIG. 5 is a further detail of the switching throttle.

A bar 21 mounted on the slide 10 carries two cantilever arms 22 and 23 which can each actuate a microswitch 24 and 25. Similarly, a bar 26 is fixed to the slide 11 and actuates two microswitches 29 and 30 with its cantilever arms 27 and 28. In the slide 10 there is a hole 31 which co-operates with a hole 32 in the slide housing 14. Corresponding holes 33 and 34 are associated with the slide 11. A cross-section of this arrangement is shown in FIG. 4. FIG. 5 shows that an adjusting element 35 can be screwed in the hole 31 to fill part of the cross-section and can be locked by a counternut 36.

Figure 3:
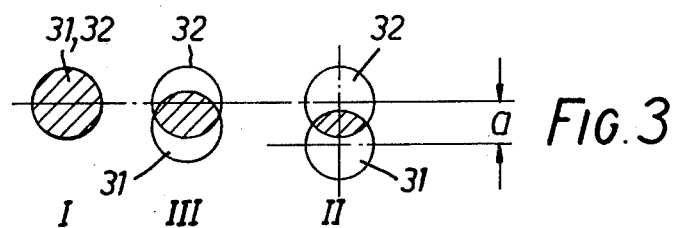
FIG. 3 is an enlarged representation of the apertures in the switching throttle.
Figure 6:
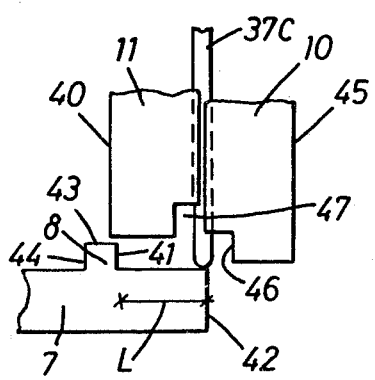
FIG. 6 is the slide arrangement shortly after actuation.

Each slide 10, 11 can assume three positions, namely, a first position I when the slide is raised upwardly by the pressure fluid to such an extent that it is located beyond the projection of the rib 8. The holes 31, 32 will then be in registry with one another, as shown in FIG. 3. In the fully lowered second position II of FIG. 1, the holes 31, 32 overlap only by the amount a, so that only the comparatively small cross-hatched cross-section remains. Throttling therefore occurs in this position. In addition, there is a third intermediate position III when the underside of the slide is seated on the rib 8 (FIG. 6). One then obtains a partial reduction in the cross-section of the passage, as likewise shown in FIG. 3.

Juxtaposed in the slide housing 9 there are four switch tappets 37a, 37b, 37c and 37d which are each associated with an actuating switch 38a, 38b, 38c and 38d. Grooves 39a, 39b and 39d are provided adjacent one another in the block 7. For this reason only the tappet 37c is raised for actuating the microswitch 38c in the case of the illustrated block 7. The tappet 37c is spaced from the front edge 40 of the slide 11 by a distance L which is somewhat larger than the spacing of the slide 41 of the rib from the step 42 of the block 7. If, therefore, the actuating switch 38c is actuated with the aid of the tappet 37c and the two slides 10, 11 move downwardly, as is still to be described hereinafter, only the slide 10 (FIG. 6) moves into the second position whilst the slide 11 becomes seated on the top surface 43 of the rib and remains in the third intermediate position. Since the arrangement is symmetrical, similar conditions apply for the other rib side 44 and the opposite side 45 of the slide 10. At the foot, the side faces 46 and 47 of the slides 10, 11 have a spacing which is only slightly larger than the width of the rib 8 between the sides 41 and 44, for example larger by an amount of 2/100 mm.

Figure 2:
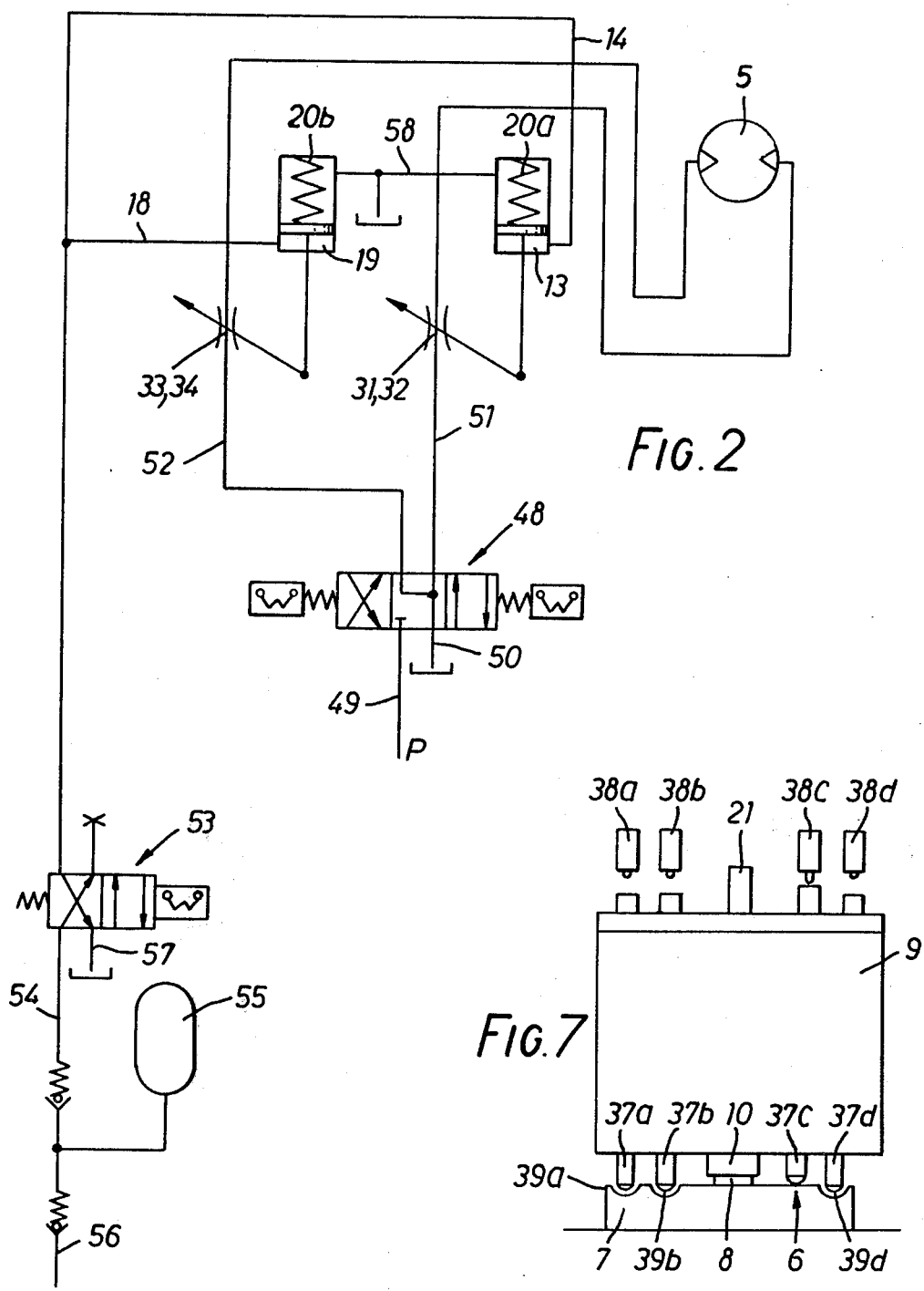
FIG. 2 is a circuit diagram of the arrangement according to FIG. 1.

FIG. 2 illustrates a 4/3-way valve as on-off switch valve 48 which is electromagnetically actuated, is connected on one side by a conduit 49 to a source P for pressure fluid and by a conduit 50 to the tank, and on the other side possesses two connecting conduits 51, 52 which each lead to the servo motor 5 by way of a switching throttle 31, 32 and 33, 34. The conduits 14 and 18 leading to the pressure chambers 13 and 19 are connected to an electromagnetically actuated actuating valve which is connected on the opposite side on the one hand by a conduit 54 to a pressure fluid accumulator 55 which, in turn, is fed by a pump through a conduit 56, and on the other hand by a conduit 57 to a tank. The two chambers for the springs 20a and 20b are provided with conduits 58 which also lead the leakage oil into the tank.

This servo device operates as follows. To adjust the movable member 3, the actuating valve 53 is first of all brought into the operating position in which pressure fluid is brought from the accumulator 55 into the two pressure chambers 13 and 19, whereby the slides 10 and 11 are raised to their first position in which they lie beyond the rib projection. At the same time the switching throttles 31, 32 and 33, 34 move to their fully open position. The on-off switching valve 48 is how brought into one of its two switching positions, whereupon the servo motor 5 starts and displaces the movable member 3. By means of a selector switch one of the actuating switches 38a – 38d and thus one of the abutment devices 6 is selected. It is assumed that this is the actuating switch 38c. As soon as this switch is actuated by the associated tappet 37c which is lifted over the step 42 of the block 7, the actuating valve 53 is de-energised. The springs 20a and 20b press the pressure fluid out of the chambers 13 and 19 into the tank and press the slides 10 and 11 downwardly. As explained in conjunction with FIG. 6, the one slide 10 thereby immediately reaches the second position whilst the other slide 11 remains in the third intermediate position on the upper surface 43 of the rib 8. This results in throttling of the switching throttles 31, 32 and 33, 34 and thus braking of the servo motor 5. The motion of the movable member is slowed down. As soon as a residual advance of such a size has been traversed that the rib 8 is located between the two faces 46 and 47, the slide 11 is also pushed into the second position by the spring 20b. This de-energises the on-off switching valve 48. For this purpose the microswitches 24, 25, 29, 30 are so intercoupled that switching off takes place only if the microswitches 24 and 29 are actuated but the microswitches 25 and 30 are not actuated. If at this instant of time the movable member should still have a speed component, a defined mechanical impact will result from abutment of the side face 46 against the rib side 41. The same conditions result if the advancing motion is in the opposite direction.

Figure 8:
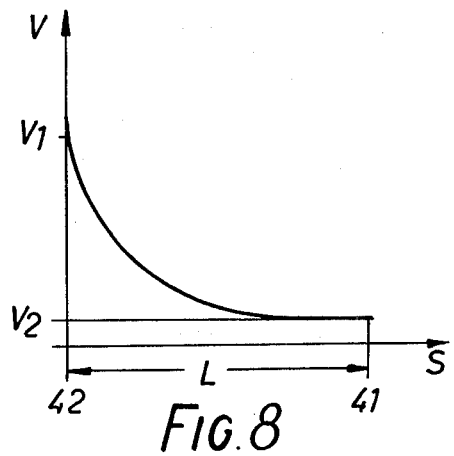
FIG. 8 is a brake diagram.

It should not be necessary to explain that a similar arrangement is obtained if the movable member 3 is turned by the servo motor 5. In other cases a cylinder-piston arrangement can also be used as servo motor. In the diagram of FIG. 8, the speed v is entered against the travel s. Along the part of travel, the position of the step 42 and the rib side 41 on the block 7 are indicated by the references 42 and 41. The normal operating speed may be vl, e.g. 40 m/min. By throttling starting at the step 42, the speed drops to the value v2 of, for example 5 m/min at the point 41. A movable member 3 displaced with this speed can be brought to a standstill without any large mechanical loading by placing the side face 46 against the rib side 41. The length L between the step 42 and the rib side 41 preferably amounts to 15 – 20 mm.

I claim:

1. A servo device comprising movable and stationary members, hydraulic servo motor means for moving said movable member along a path in either of two selected directions, a transversely extending stop unit attached to said movable member, a rib on said stop unit, fluid pressure operated first and second adjacently arranged stop members movable transversely relative to said path, said stop members jointly defining a recess having a width generally equal to the width of said rib for cooperating with said rib to prevent movement of said movable member, first valve and circuit means for supplying a working fluid to said servo motor means, said first circuit means having throttle valve means formed between said stationary member and at least one of said stop members for throttling the fluid flow from said first valve to said servo motor means, first switch means operated by said stop members to open said first valve when said stop members are in initial up positions and to close said first valve when both of said stop members are in final down positions resting on said stop unit, second valve and circuit means for moving each of said stop members to initial positions which clear said rib and actuate said first switch means, second switch means actuated by said stop unit for closing said second valve to cause said stop members to descend until one rests in an intermediate position on said rib wherein throttling occurs in said first circuit and the other rests in a final position on said stop unit.

2. A servo device according to claim 1 wherein said throttle valve means are in both of said stop members and connected to opposite sides of said servo motor means.

3. A servo device according to claim 1 wherein said throttle valve means includes ports in said stationary member and openings in said stop members which cooperate to throttle the flow in said first circuit means.

4. A servo device according to claim 3 including an adjusting member for varying the effect of said throttle valve means.

5. A servo device according to claim 1 including spring means for biasing said stop members towards final resting positions on said stop unit.

6. A servo device according to claim 1 wherein said second switch means includes tappet means mounted in said stationary member, said tappet means being actuatable upon being contacted by a leading edge of said stop unit.

7. A servo device according to claim 6 wherein said tappet means includes a plurality of tappets, said stop unit having grooves for receiving all but one of said tappets to allow only said one of said tappets to be actuated.

* * * * *